United States Patent [19]

Leibach

[11] 3,856,239
[45] Dec. 24, 1974

[54] APPARATUS FOR THRUST REVERSAL
[75] Inventor: Heinrich Leibach, Grafrath-Wildenroth, Germany
[73] Assignee: Motoren-und Turbinen-Union Munchen GmbH, Munich, Germany
[22] Filed: Aug. 27, 1973
[21] Appl. No.: 391,842

[30] Foreign Application Priority Data
Aug. 25, 1972 Germany............................ 2241817

[52] U.S. Cl................ 244/12 D, 60/226 A, 60/230, 239/265.19, 244/53 R, 244/110 B
[51] Int. Cl............................................. B64c 15/06
[58] Field of Search........ 244/12 R, 12 D, 53 R, 52, 244/23 D, 110 B; 60/226 R, 226 A, 229, 230, 60/232; 239/265.25, 265.29, 265.37, 239/265.39, 265.19; 115/12 R; 114/151

[56] References Cited
UNITED STATES PATENTS

| 2,735,264 | 2/1956 | Jewett............................ 239/265.37 |
| 2,963,858 | 12/1960 | Lovett............................ 239/265.39 |
| 3,024,601 | 3/1962 | Nash............................. 60/226 A X |
| 3,290,886 | 12/1966 | Monaghan................. 239/265.25 X |
| 3,660,982 | 5/1972 | Gozlan............................. 60/232 X |

Primary Examiner—Trygve M. Blix
Assistant Examiner—Barry L. Kelmachter
Attorney, Agent, or Firm—Craig & Antonelli

[57] ABSTRACT

Apparatus for thrust reversal on a turbojet engine which includes two sets of deflector flaps which are movable into the path of exhaust gases to effect a thrust reversal. The two sets of flaps are arranged immediately one behind the other such that they can be moved jointly together to effect a thrust reversal for normal engine operation without afterburning. The flaps are also movable with respect to one another so that, with the most forward of the sets of flaps in an intermediate thrust reversal position so as to deflect flow from the thrust nozzle around the outer portions thereof, the second set of flaps arranged rearwardly of the first set can be pivoted into position for deflecting the central area of exhaust flow at a position spaced downstream of the first set of flaps. In this manner, the first set of flaps effectively deflects the cooler bypass air flow so as to create an insulating cushion for adjacent engine parts, while the second set of flaps effects a thrust reversal from the hot central exhaust gas stream. By spacing the first and second set of flaps from one another for afterburner operation, openings between the two sets of flaps in the lateral direction effect an increase in the nozzle exit discharge area to accommodate the augmented gas flow due to afterburning.

38 Claims, 7 Drawing Figures

3,856,239

APPARATUS FOR THRUST REVERSAL

BACKGROUND AND SUMMARY OF THE INVENTION

This invention relates to apparatus for thrust reversal for turbojet engines equipped with afterburning means, particularly for aircraft, where thrust reversal is achieved by means of laterally deployable deflecting elements which are pivoted into the thrust jet downstream of the thrust nozzle.

Previously contemplated thrust reversal apparatus of the just cited category invariably pose the risk that thrust jets deflected laterally or obliquely forward to decelerate the aircraft come in contact with portions of the fuselage, the engine or the engine cowling, or pass along in relatively close proximity of adjacent fuselage or engine sections. As a result, wall sections near or even wetted by the deflected thrust jets, such as of the engine nacelle or fuselage, may wear prematurely or even burn through, especially when it is intended to light the afterburner at least intermittently also during thrust reversal.

This above-discussed risk might be somewhat or slightly relieved by causing the deflectors during thrust reversal to spread the jet thrust a little further to the side. This measure may, however, cause a disadvantageous reduction in the resultant reverse thrust component.

A further consideration herein is that with modern turbojet engines of bypass construction the hot gas stream issuing from the thrust nozzle is normally enveloped by the cold bypass stream or that at least the boundary zone of the hot gas stream exiting from the thrust nozzle may be a lower temperature by mixing with portions of the bypass stream. This last-mentioned consideration especially applies to the gas stream when heavily heated during afterburner operation. That is, with an engine equipped with an afterburner operated during thrust reversal, different cross-sectional areas of the gases issuing from the thrust nozzles have different temperatures.

During thrust reversal, especially with the afterburner lit, the presence of the cooling boundary zone of the hot gas jet will in itself, however, not inherently eliminate the risk of injuring wall sections of the aircraft or engine which lie near the deflected thrust jet.

A further consideration is that a thrust reversing device which is to function also with the afterburner of the jet engine lit should also preferably be able to allow for the then augmented mass flow (augmented afterburning) of the thrust jet to be deflected.

The present invention contemplates providing a thrust reversing device or apparatus where the deflected thrust jets, particularly with the afterburner of a jet engine lit, will not cause excessive heating of, e.g., fuselage or engine sections.

In a further aspect of this invention the thrust reversing device shall be able to cater or accommodate the augmented mass flow of the thrust jet to be deflected when the afterburner is lit.

In a still further aspect of this invention the thrust reversing device is, in the interest of a high degree of operational reliability, simple in construction and permits rapid actuation at relatively little actuating effort of the flap elements for deflecting the thrust jet.

The present invention particularly contemplated providing a thrust reversing device in which the deflecting elements are formed by basic flaps and additional flaps which are either jointly pivoted into an operating position or jointly but along different tracks pivoted into separate operating positions. For thrust reversal with afterburning the basic flaps are movable to an intermediate position (relative to their full range of movement) where they essentially act on the outer bypass air stream while the additional flaps are movable beyond or with respect to the basic flaps to a position spaced in the direction of flow and so as to act on the hot gas stream. For thrust reversal without afterburning, the basic and additional flaps are movable together to respective thrust reversing positions with the basic flaps exhibiting the flow deflecting surfaces. The thrust reversing device of this invention is therefore suitable for operation with the afterburner of the jet engine unlit or lit.

During thrust reversal with the afterburner unlit the basic and additional flaps may be jointly pivoted into the exhaust gas stream at a point downstream of the thrust nozzle. This would assume that the engine thrust nozzle is in the cruise position at its narrowest gas exhaust area. The associated gas exhaust area for the reversed thrust jet is then essentially defined by the extreme ends of the basic flaps on the one hand and by the end of the thrust nozzle or engine on the other.

For thrust reversal with the afterburner lit the effective gas exhaust area of the reversed thrust jet is increased chiefly by additionally deploying the additional flaps behind the basic flaps.

In a preferred advantageous embodiment of the present invention, the basic flaps are constructed as a first pair of flaps downstream of the thrust nozzle which are pivoted into a position such that they act on and deflect the cold bypass air stream which is discharged by an engine compressor or fan in the second cycle and which envelopes the hot gas stream issuing from the thrust nozzle.

Owing to the above-mentioned position and arrangement of the basic flaps, a veil of reverse thrust air is achieved which is formed by compressed air of relatively low temperature and which operates as an insulating "wall" to shield adjacent engine or fuselage sections from the veil of hot gas deflected by the additional flaps.

These and further objects, features and advantages of the present invention will become more obvious from the following description when taken in connection with the accompanying drawings, which show, for purposes of illustration only, several embodiments in accordance with the present invention.

DETAILED DESCRIPTION OF THE DRAWINGS

Figure 1:
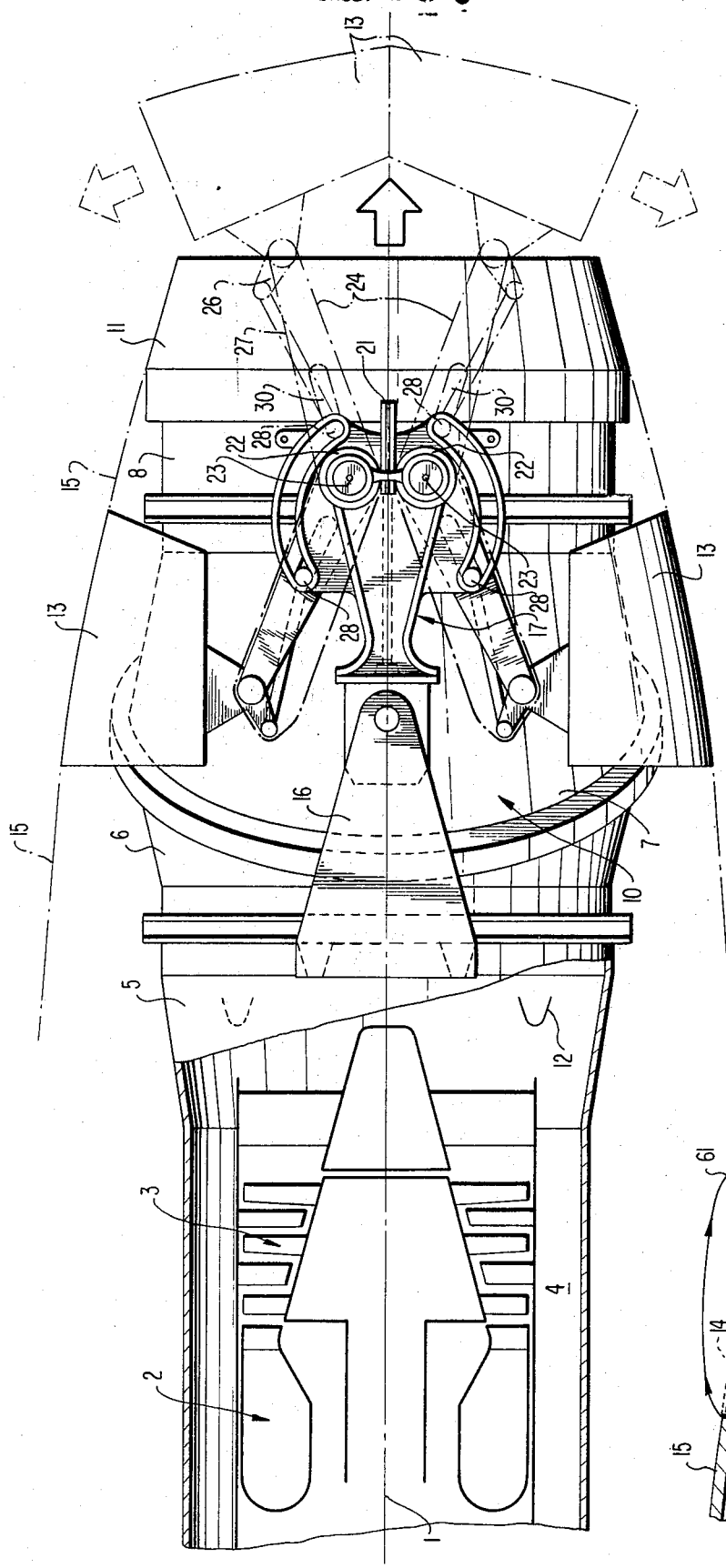
FIG. 1 is a lateral schematic view which illustrates a thrust reversing device on the jet pipe of a jet engine in accordance with a preferred embodiment of the present invention, where for clarity of presentation the associated basic flaps only are shown.

FIG. 1 illustrates a turbojet engine, with part of it broken away for clarity of presentation, having a combustion chamber system 2 extending coaxially to the longitudinal centerline 1 of the engine and behind it a multi-stage turbine 3. A front fan or compressor not shown on the accompanying drawings discharges compressed air into an annulus 4 which extends coaxially to the engine centerline 1. The hot gas stream issuing from the turbine 3 is enveloped by the bypass air stream from annulus 4. Both streams flow into a jet pipe 10 which here consists of pipe sections 5, 6, 7 and 8. The pipe section 8 carries at its end a variable thrust nozzle 11, the gas exhaust area of which can be further opened when the afterburner is in action. A flame holder associated with the afterburner is generally indicated by the numeral 12.

The pipe sections 6 and 7 arranged between the pipe sections 5 and 8 may be pivotally or rotably connected together such that the gas jet issuing from the thrust nozzle 11 may be directed horizontally aft (horizontal aircraft attitude (FIG. 1) or vertically downward (vertical flight) or diagonally aft and down (short take-off). The pipe sections 6, 7 may conceivably be pivoted to achieve any desirable exhaust direction for directional control. A practical embodiment of a steel pipe for pivotal movement in the just described manner is described in German patent 2,056,088 and in U.S. application Ser. No. 229,305, filed Feb. 25, 1972.

For clarity of presentation, the FIG. 1 illustration of the thrust reversing device includes only the basic flaps 13 which, together with the additional flaps 14 (FIG. 2 and FIGS. 3 to 6) are deployable from the engine cowling 15 (FIG. 1) to produce the intended reverse thrust when in the position indicated by the broken line.

The adjusting means for folding and deploying the basic flaps 13 and additional flaps 14 are as follows:

On either side of the jet pipe 10 is a mounting pad 16 which is located on the pipe section 5 and carries a bracket 17. The bracket 17 secures a hydraulically or pneumatically operated control piston 19 (FIG. 2) which is slideably mounted for axial movement in a cylinder 18 and has a piston rod 20 which terminates in a toothed rack 21 (FIG. 1) which engages with the circumferential teeth on hubs 22 of main levers 24 which are pivotally mounted about cross axes 23.

A basic flap 13 and an additional flap 14 are pivotally connected at the point 25 on each main lever 24.

Extension and retraction of the rack 21 operated by the control piston 19 causes the main levers 24 to move in a circular arc about axes 23 respectively.

In contrast with the main levers 24 which move in a circular arc, the basic and additional flaps 13, 14 move in an extremely flat curve when folding and deploying. This is achieved by means of positioning levers 26 arranged on the fixed sections 25'(FIG. 2) of the basic flaps 13. Coupled with the positioning levers 26 are pull or push rods 27 which are movable along guide means 29 with the air of rollers 28. These guide means 29 have an eccentric (relative to the pivot points 23 of the main levers 24), flatly curved shape. Then when the respective adjacent main levers 24 on one side of the jet pipe 10 move towards each other for thrust reversal, or when they move apart for folding the basic and additional flaps 13, 14, the eccentricity between the pivotal points 23 of the main levers 24 and the guide means 29 is balanced by means of guide slots 30 of the main levers 24; the ends of the pull or push rods 27 take the shape of rollers for movement within said guide slots 30.

An essential advantage offered by this arrangement is that the basic folding or deploying movement of a basic and additional flap 13, 14 on either side of the jet pipe 10 is accomplished with the aid of only a single main lever 24.

The flatly curved travel path of the basic and additional flaps 13, 14 affords an advantage in that it minimizes aerodynamic losses in the tail area of the aircraft or nacelle which accommodates the engine, and it provides a further advantage in that excessively abrupt deploying movement of the flaps early in the thrust reversing process as a result of the prevailing outside air flow is prevented. That is, due to the flatly curved travel path, outside air flow forces on the flaps are minimized.

Figure 2:
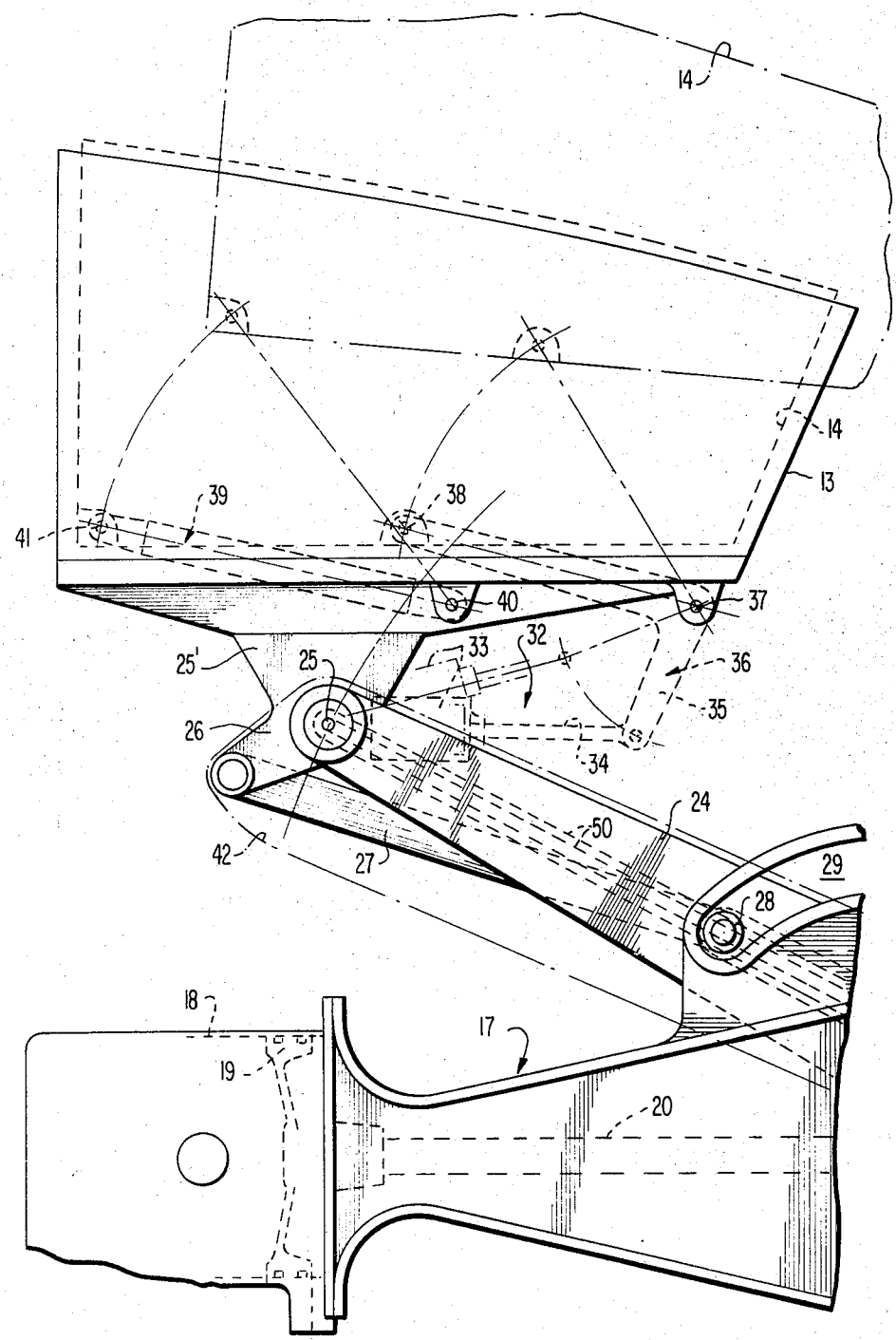
FIG. 2 is a lateral schematic view which illustrates a portion of the actuating system for a basic and an additional flap in accordance with the thrust reversing device of FIG. 1.

As best shown in FIG. 2, an additional actuating system 32 is interconnected between each main lever 24 and associated additional flap 14 in order to pivot the additional flaps 14 into the gas stream at some distance from the basic flaps 13. This feature will be described more fully later in conjunction with FIGS. 5 and 6.

The additional actuating system 32 comprises a hydraulically or pneumatically operated control piston which is slideably arranged within a cylinder 33. The cylinder 33 is pivotally connected to the point 25 of the bearing means for the associated basic flap 13, while a pull or push rod 34 connecting to the control piston and extending from the cylinder 33 acts on at least one arm 35 of each of a pair of bellcranks 36. Supply line 50 for cylinder 33 are routed through the respective main pivot levers and the pivot axes at opposite ends thereof. These bellcranks 36 are each pivotally arranged on the basic flap 13 at or near their apex 37. The remaining free ends of the bellcranks 36 are hinged to the additional flap 14 at respective points 38.

A further pair of guide levers 39 are pivotally connected to the basic and additional flaps 13, 14 at respective points 40, 41.

As best shown in FIG. 2 the main levers 24 and the associated pull or push rods 27 are preferably enveloped by a thermally insulating fairing 42.

Since each of two sides of jet pipe 10 has a bracket 17 with two main levers 24, two bellcranks 36 and two guide levers 39, a total of four levers 24, four bellcranks 36, and four guide levers 39 are provided in the preferred embodiment illustrated in FIGS. 1 and 2, with respective bellcranks 36 and guide levers 39 at each set of flaps 13, 14 being arranged one above the other.

Figure 3:
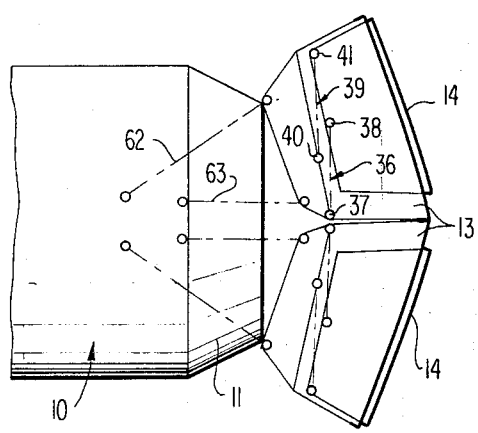
FIG. 3 is a schematic view which shows a first operating position of the thrust reversing device of the present invention.

FIG. 3 schematically shows the basic and additional flaps 13, 14 disposed together at a position downstream of the thrust nozzle 11, after they have been jointly deployed from the engine cowling 15 by main pivot levers 24 and associated guide structures. This is the intended extreme position of the jointly deployed basic and additional flaps 13, 14 for thrust reversal with the afterburner unlit, when the gas exhaust area of the thrust nozzle 11 is narrowest.

Figure 4:
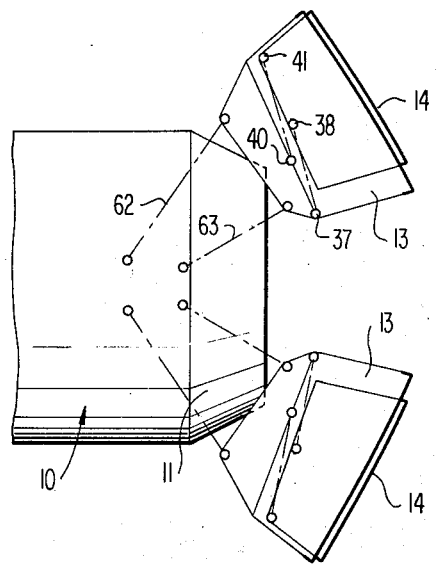
FIG. 4 is a schematic view which shows a second operating position of the basic and additional flaps of the thrust reversing device of the present invention.
Figure 5:
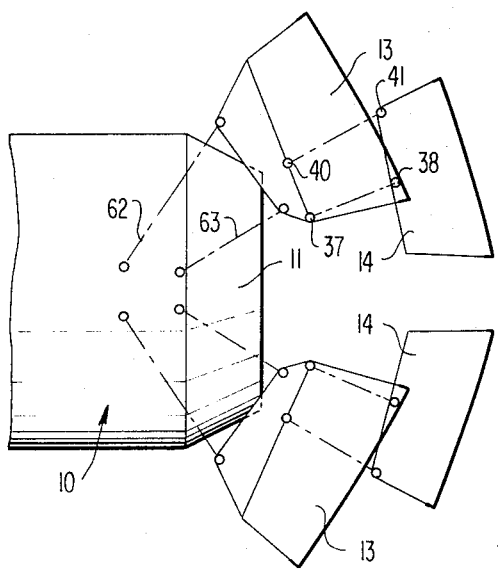
FIG. 5 is a schematic view which shows a third operating position of the thrust reversing device of the present invention.

FIG. 4 schematically illustrates another operative position of the flaps of the thrust reversal device with the jointly conveyed basic and additional flaps 13, 14 in an intermediate position which may be selected when it is intended, with the afterburner unlit, to exploit only a portion of the available reverse thrust.

For thrust reversal with the afterburner lit, on the other hand, the basic flaps 13 may be allowed to remain in their position indicated in FIG. 4, while the additional flaps 14 are extended — by operating the respective additional actuating system 32 (FIG. 2) — away from the basic flaps 13 and farther aft into the hot gas stream (FIG. 5) until they contact one with the other (FIG. 6) for full action on the hot gas stream.

Figure 6:
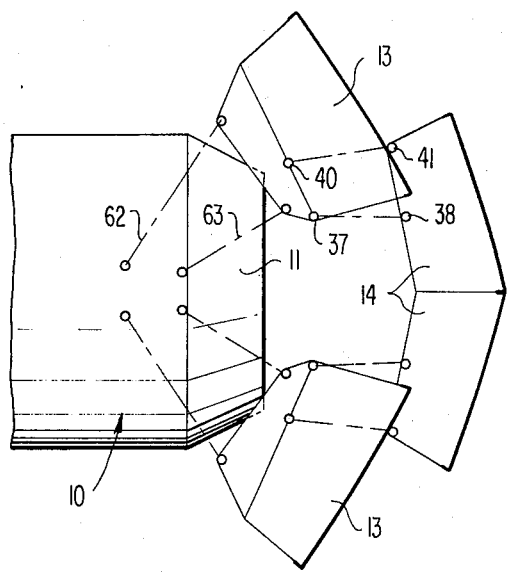
FIG. 6 is a schematic view which shows a fourth operating position of the thrust reversing device of the present invention.

In the operating position of the thrust reversing device as shown in FIG. 6 the basic flaps 13 are positioned so as to essentially deflect the bypass air stream while the additional flaps 14 behind them act on and deflect the reheated exhaust gas which is exited from the center area of the nozzle 11. This arrangement will ensure that during thrust reversal with the afterburner lit, engine, fuselage or nacelle sections are not affected by the greatly heated, deflected jets of thrust due to the longitudinal spacing of flaps 14 from the nozzle area.

A further advantage of the operating position illustrated by FIG. 6 is that the additional flaps 14, when extended behind the basic flaps 13 for thrust reversal with the afterburner lit, will simultaneously provide the increase in gas exhaust area needed for the augmented gas flow during afterburning due to the lateral openings between flaps 13 and 14.

It is also contemplated to utilize the present invention such that during operation with the afterburner lit the additional flaps 14 are not fully deployed to a point where they contact one with the other, so that a small portion of the hot gas stream may be allowed to escape horizontally aft (position not specifically illustrated).

It is further contemplated by the present invention that the actuation of the variable thrust nozzle 11 for reheated or afterburning operation may suitably be coordinated with the actuation of the additional actuating system 32 (FIG. 2) for deploying the additional flaps 14 so as to optimize the total effective exhaust gas area during thrust reversal with afterburning.

FIGS. 3 to 6 are intended to show a different possible flap position for the various operational modes, such as with or without afterburning. These FIGS. 3 to 6 differ from FIGS. 1 and 2 in that the main and additional flaps 13 and 14 according to FIGS. 3 to 6 are actuated by a pair of levers 62, 63 being disposed in each case on both sides of the jet pipe 10 in such a manner that the flat parabolic movement of the flaps according to FIG. 1 will not be obtained in the illustrated arrangement of FIGS. 3 to 6. However, it will be understood that the same operating sequence with relative movement of the basic and additional flaps according to FIGS. 3 to 6 can be effected with the specifically described embodiment of FIGS. 1 and 2, with the additional advantage that the flaps will move together in the flat, parabolic path.

Figure 7:
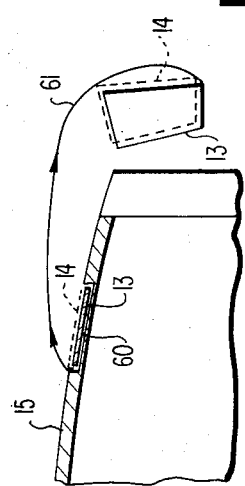
FIG. 7 is a partial schematic view showing relationship of the reversing flaps to the engine cowling of the preferred embodiment of FIGS. 1 and 2.

FIG. 7 schematically illustrates how the flaps 13, 14 are accommodated in recess 60 of the engine cowling 15 preliminary to their pivotal movement into an operational thrust reversing position. The flaps 13 and 14 and the recesses 60 are designed so as to not interrupt the outer contour of the cowling 15 when the flaps 13 and 14 are in the stored condition in the recesses 60.

While I have shown and described several embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. Thrust reversing apparatus for a vehicle having a turbojet engine equipped with a thrust nozzle; said apparatus comprising:

first thrust reversing flap means, second thrust reversing flap means, first flap adjusting means for moving said first flap means between inoperative positions out of deflecting engagement with the flow of gases through said thrust nozzle and operative positions with flow deflecting surfaces of said first flap means in deflecting engagement with at least a portion of said flow of gases, and second flap adjusting means for moving said second flap means between inoperative positions out of deflecting engagement with said flow of gases and operative positions with flow deflecting surfaces of said second flap means in deflecting engagement with at least a portion of said flow of gases, said first and second adjusting means including means for moving said first and second flap means to respective first positions with only said first flap means furnishing flow deflecting surfaces for said flow of gases and to respective second positions with both said first and second flap means furnishing flow deflecting surfaces for said flow of gases, said first and second flap means being spaced from one another in the direction of gas flow through said thrust nozzle when in said respective second positions, wherein each of said first and second flap means includes a pair of flap members, the flap members of each pair being disposed at opposite sides of a centerline of said thrust nozzle, wherein said first adjusting means includes a main pivot lever for each flap member of said first flap means, each of said main pivot levers being pivotable at one end about a respective pivot axes which is fixed in position with respect to jet pipe means arranged upstream of said thrust nozzle, the respective other ends of each of said main pivot levers being pivotally connected to respective flap members of said first flap means, wherein a pull-push rod is provided between each flap member of said first flap means and a respective guide path extending eccentrically with respect to the fixed pivot axis of the associated main pivot lever, each of said pull-push rods having one end pivotally attached at the respective flap member by way of a pivotal connection spaced from the pivotal connection between said associated main pivot lever and respective flap member and the other opposite end slideably guided in the respective guide path such that pivotal movement of said main levers along a circular arc about the respective fixed pivot axes effects a flatly curved path of movement of said flap members of said first flap means between operative and inoperative positions thereof.

2. Apparatus according to claim 1, wherein said flap members of said second flap means are attached to and movable with respective flap members of said first flap means.

3. Apparatus according to claim 1, wherein each main pivot lever is provided with a guide slot engageable with the end of the respective pull-push rod in the respective guide path.

4. Apparatus according to claim 3, wherein said flap members of said second flap means are attached to and movable with respective flap members of said first flap means.

5. Apparatus according to claim 2, wherein said second adjusting means includes an actuating system arranged between respective flap members of said first and second flap means for moving said flap members of said second flap means with respect to said flap members of said first flap means.

6. Apparatus according to claim 5, wherein said turbojet engine includes bypass flow means for furnishing a flow of bypass air to said thrust nozzle in bypassing relationship to a combustion chamber of said engine and afterburner means downstream of said combustion chamber for furnishing a hot gas stream to said thrust nozzle such that said hot gas stream and bypass air are concentrated in different crosssectional areas of the exit end of said thrust nozzle, and wherein the deflecting surfaces of said first flap means are in engagement primarily with said bypass air and the deflecting surfaces of said second flap means are in engagement primarily with said hot gas stream when said first and second flap means are in said respective second positions and said afterburner means is operated.

7. Apparatus according to claim 5, wherein said actuating system includes a piston-cylinder arrangement at each side of said centerline, one end of each respective piston-cylinder arrangement being pivotally connected at the pivotal connection between a respective main pivot lever and flap member of said first flap means, the other end of each respective piston-cylinder arrangement being connected to a free end of an arm of a bellcrank, each bellcrank including another arm having a free end pivotally connected to a flap member of said second flap means, the apex of said bellcrank between said arms being pivotally attached to a flap member of said first flap means, and additional lever means pivotally connected at one end thereof to a respective flap member of said first flap means and at the other end thereof to a respective flap member of said second flap means, said additional lever means serving to aid said bellcrank in guiding movement between said flap members when said piston cylinder arrangement is actuated to move the ends thereof relative to one another.

8. Apparatus according to claim 7, wherein said piston-cylinder arrangement is actuable by fluid pressure means.

9. Apparatus according to claim 7, wherein said turbojet engine includes bypass flow means for furnishing a flow of bypass air to said thrust nozzle in bypassing relationship to a combustion chamber of said engine and afterburner means downstream of said combustion chamber for furnishing a hot gas stream to said thrust nozzle such that said hot gas stream and bypass air are concentrated in different cross-sectional areas of the exit end of said thrust nozzle, and wherein the deflecting surfaces of said first flap means are in engagement primarily with said bypass air and the deflecting surfaces of said second flap means are in engagement primarily with said hot gas stream when said first and second flap means are in said respective second positions and said afterburner means is operated.

10. Apparatus according to claim 7, wherein supply lines for said piston-cylinder arrangements are provided, said supply lines being routed from respective fixed pivot axes of a respective main pivot lever, through said respective main pivot lever, and into a cylinder of said piston-cylinder arrangement by way of the pivotal connection of the respective main pivot lever at a respective flap member of said first flap means.

11. Apparatus according to claim 10, wherein said turbojet engine includes bypass flow means for furnishing a flow of bypass air to said thrust nozzle in bypassing relationship to a combustion chamber of said engine and afterburner means downstream of said combustion chamber for furnishing a hot gas stream to said thrust nozzle such that said hot gas stream and bypass air are concentrated in different crosssectional areas of the exit end of said thrust nozzle, and wherein the deflecting surfaces of said first flap means are in engagement primarily with said bypass air and the deflecting surfaces of said second flap means are in engagement primarily with said hot gas stream when said first and second flap means are in said respective second positions and said afterburner means is operated.

12. Apparatus according to claim 7, wherein said vehicle is an aircraft.

13. Apparatus according to claim 1, wherein said first adjusting means includes a toothed rack movable between and engageable with said main pivot levers to cause counterrotational movement of said main pivot levers about the respective fixed pivot axes thereof.

14. Apparatus according to claim 13, wherein power means including fluid pressure means are provided for imparting movement to said toothed rack means.

15. Apparatus according to claim 14, wherein the power means, main pivot levers, pull-push rods, and guide paths are all combined into one structurally compact unit arranged on a bracket secured by a mounting pad to a fixedly mounted section of jet pipe arranged upstream of said thrust nozzle and of movable jet pipe sections for changing the orientation of said thrust nozzle.

16. Apparatus according to claim 1, wherein the main pivot levers, power means for pivotally moving said main pivot levers, pull-push rods, and guide paths are all combined into one structurally compact unit arranged on a bracket secured by a mounting pad to a fixedly mounted section of jet pipe arranged upstream of said thrust nozzle and of movable jet pipe sections for changing the orientation of said thrust nozzle.

17. Apparatus according to claim 1, further comprising a heat insulating fairing enclosing said main pivot levers and pull-push rods.

18. Apparatus according to claim 1, wherein said vehicle is an aircraft.

19. Thrust reversing apparatus for a jet engine of the type equipped with a combustion chamber, a thrust nozzle, afterburner means downstream of said combustion chamber for furnishing a hot gas stream to said thrust nozzle, and bypass flow means for furnishing a flow of bypass gases to said thrust nozzle in bypassing relationship to said afterburner means such that said hot gas stream and bypass gases are concentrated in different cross-sectional areas of the exit end of said thrust nozzle; said apparatus comprising:
first thrust reversing flap means,
second thrust reversing flap means,
first flap adjusting means for moving said first flap means between inoperative positions out of deflecting engagement with the flow of gases through said thrust nozzle and operative positions with flow deflecting surfaces of said first flap means in deflecting engagement with at least a portion of said flow of gases,
second flap adjusting means for moving said second flap means between inoperative positions out of deflecting engagement with said flow of gases and operative positions with flow deflecting surfaces of said second flap means in deflecting engagement with at least a portion of said flow of gases, said second flap adjusting means including means for rearwardly moving said second flap means with respect to said first flap means to change the relative distance of said first and second flap means from the exit end of said thrust nozzle,
and flap control means for controlling changes of said flap adjusting means between respective first operating conditions for thrust reversal with said afterburner out of operation with said first flap means furnishing flow deflecting surfaces for said flow of gases and respective second operating conditions for thrust reversal with said afterburner in operation with said second flap means spaced further from said first flap means in a direction away from said exit end of said thrust nozzle than when said flap adjusting means are in said first operating conditions, the deflecting surfaces of said first flap means being in engagement primarily with said bypass gases and the deflecting surfaces of said second flap means being in engagement primarily with said hot gas stream when said flap adjusting means are in said respective second operating conditions, and the deflecting surfaces of said second flap means being spaced further than the deflecting surfaces of said first flap means from said exit end when said flap adjusting means are in said respective second operating conditions.

20. Apparatus according to claim 19, wherein said thrust nozzle exhibits a straight centerline extending in the direction of gas flow through said thrust nozzle, and wherein the deflecting surfaces of said second flap means are positioned closer to said centerline than are the deflecting surfaces of said first flap means when said first and second flap adjusting means are in said respective second operating conditions.

21. Apparatus according to claim 20, wherein said engine is a turbojet engine and said bypass flow means includes means for furnishing said flow of bypass gases to said thrust nozzle in bypassing relationship to said combustion chamber.

22. Apparatus according to claim 21, wherein said vehicle is an aircraft.

23. Apparatus according to claim 19, wherein each of said first and second flap means includes a pair of flap members, the flap members of each pair being disposed at opposite sides of a centerline of said thrust nozzle, wherein said first adjusting means includes a main pivot lever for each flap member of said first flap means, each of said main pivot levers being pivotable at one end about a respective pivot axes which is fixed in position with respect to jet pipe means arranged upstream of said thrust nozzle, the respective other ends of each of said main pivot levers being pivotally connected to respective flap members of said first flap means, wherein a pull-push rod is provided between each flap member of said first flap means and a respective guide path extending eccentrically with respect to the fixed pivot axis of the associated main pivot lever, each of said pull-push rods having one end pivotally attached at the respective flap member by way of a pivotal connection spaced from the pivotal connection between said associated main pivot lever and respective flap member and the other opposite end slideably guided in the respective guide path such that pivotal movement of said main levers along a circular arc about the respective fixed pivot axes effects a flatly curved path of movement of said flap members of said first flap means between operative and inoperative positions thereof.

24. Apparatus according to claim 23, wherein said flap members of said second flap means are attached to and movable with respective flap members of said first flap means.

25. Apparatus according to claim 24, wherein said second adjusting means includes an actuating system arranged between respective flap members of said first and second flap means for moving said flap members of said second flap means with respect to said flap members of said first flap means.

26. Apparatus according to claim 25, wherein said actuating system includes a piston-cylinder arrangement at each side of said centerline, one end of each respective piston-cylinder arrangement being pivotally connected at the pivotal connection between a respective main pivot lever and flap member of said first flap means, the other end of each respective piston-cylinder arrangement being connected to a free end of an arm of a bellcrank, each bellcrank including another arm having a free end pivotally connected to a flap member of said second flap means, the apex of said bellcrank between said arms being pivotally attached to a flap member of said first flap means, and additional lever means pivotally connected at one end thereof to a respective flap member of said first flap means and at the other end thereof to a respective flap member of said second flap means, said additional lever means serving to aid said bellcrank in guiding movement between said flap members when said piston cylinder arrangement is actuated to move the ends thereof relative to one another.

27. Apparatus according to claim 23, wherein each main pivot lever is provided with a guide slot engageable with the end of the respective pull-push rod in the respective guide path.

28. Apparatus according to claim 19, wherein said first adjusting means includes: main pivot levers, each main pivot lever being connected at one end thereof to a flap member of said first flap means and at the other end thereof to a fixed pivot support of said engine, a toothed rack movable between and engageable with two of said main pivot levers to cause counterrotational movement of said two main pivot levers, and power means for moving said toothed rack.

29. Apparatus according to claim 28, wherein said power means includes fluid pressure means.

30. Apparatus according to claim 28, wherein said power means includes electric means.

31. Apparatus according to claim 19, wherein said first and second flap means are spaced from one another and configured such that lateral openings for said gases are provided intermediate said first and second flap means when said first and second flap means are in said respective second positions, whereby the effective nozzle exit area is modified so as to accommodate the augmented gas flow during afterburning operations.

32. Apparatus according to claim 19, wherein said vehicle is an aircraft.

33. Apparatus according to claim 19, wherein said engine is a turbojet engine and said bypass flow means includes means for furnishing said flow of bypass gases to said thrust nozzle in bypassing relationship to said combustion chamber.

34. Apparatus according to claim 33, wherein said first flap means includes a pair of first flap members movable with respect to one another between said inoperative positions with said first flap members maximally spaced from one another to operative positions with said first flap members more closely spaced from one another with deflecting surfaces thereon in line with the flow of gases exiting from the thrust nozzle, wherein said second flap means includes a pair of second flap members, each of said second flap members being pivotally connected to a respective one of said first flap members by way of first and second pairs of levers, each of said pairs of levers being pivotally connected at both said respective first and second flap members.

35. Thrust reversing apparatus for a jet engine of the type equipped with a combustion chamber, a thrust nozzle, afterburner means downstream of said combustion chamber for furnishing a hot gas stream to said thrust nozzle, and bypass flow means for furnishing a flow of bypass gases to said thrust nozzle in bypassing relationship to said afterburner means such that said hot gas stream and bypass gases are concentrated in different cross-sectional areas of the exit end of said thrust nozzle; said apparatus comprising:
   first thrust reversing flap means,
   second thrust reversing flap means,
   first flap adjusting means for moving said first flap means between inoperative positions out of deflecting engagement with the flow of gases through said thrust nozzle and operative positions with flow deflecting surfaces of said first flap means in deflecting engagement with at least a portion of said flow of gases,
   second flap adjusting means mounted on said first flap means for moving said second flap means between inoperative positions out of deflecting engagement with said flow of gases and operative positions with flow deflecting surfaces of said second flap means in deflecting engagement with at least a portion of said flow of gases,
   and flap control means for changing said flap adjusting means from first operating conditions with said first and second flap means in said inoperative positions out of deflecting engagement with the flow of gases through said thrust nozzle to second operating conditions for thrust reversal with said afterburner in operation and with the deflecting surfaces of said first flap means in engagement primarily with the bypass gases and the deflecting surfaces of said second flap means in engagement primarily with the hot gas stream, the deflecting surfaces of said second flap means being rearwardly spaced further than the deflecting surfaces of said first flap means from the exit end of said thrust nozzle with at least one opening being formed intermediate said first and second flap means when said flap adjusting means are in said second operating conditions, whereby said at least one opening modifies the effective total nozzle exit areas so as to accommodate the augmented gas flow with thrust reversal during afterburner operations.

36. Apparatus according to claim 35, wherein said engine is a turbojet engine and said bypass flow means includes means for furnishing said flow of bypass gases to said thrust nozzle in bypassing relationsip to said combustion chamber.

37. Apparatus according to claim 35, wherein each of said first and second flap means includes a pair of flap members, the flap members of each pair being disposed at opposite sides of a centerline of said thrust nozzle, wherein said first adjusting means includes a main pivot lever for each flap member of said first flap means, each of said main pivot levers being pivotable at one end about a respective pivot axes which is fixed in position with respect to jet pipe means arranged upstream of said thrust nozzle, the respective other ends of each of said main pivot levers being pivotally connected to respective flap members of said first flap means, wherein a pull-push rod is provided between each flap member of said first flap means and a respective guide path extending eccentrically with respect to the fixed pivot axis of the associated main pivot lever, each of said pull-push rods having one end pivotally attached at the respective flap member by way of a pivotal connection spaced from the pivotal connection between said associated main pivot lever and respective flap member and the other opposite end slideably guided in the respective guide path such that pivotal movement of said main levers along a circular arc about the respective fixed pivot axes effects a flatly curved path of movement of said flap members of said first flap means between operative and inoperative positions thereof.

38. Apparatus according to claim 35, wherein said second flap adjusting means includes means for moving said second flap means with respect to said first flap means to change the relative distance of said first and second flap means from the exit end of said thrust nozzle.

\* \* \* \* \*